United States Patent
Nikitas et al.

(10) Patent No.: US 12,355,864 B1
(45) Date of Patent: Jul. 8, 2025

(54) TRUST FRAMEWORK AGAINST SYSTEMATIC CRYPTOGRAPHIC BREACH

(71) Applicant: Amazon Technologies, Inc., Seattle, WA (US)

(72) Inventors: Dalton James Nikitas, Seattle, WA (US); Steve Preston Lightner Norum, Richmond, VA (US); Avni Harilal Rambhia, Fairfax, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/490,382

(22) Filed: Sep. 30, 2021

Related U.S. Application Data

(62) Division of application No. 16/011,230, filed on Jun. 18, 2018, now Pat. No. 11,153,074.

(51) Int. Cl.
| | | |
|---|---|---|
| *H04L 9/06* | (2006.01) | |
| *G06F 21/70* | (2013.01) | |
| *H04L 9/08* | (2006.01) | |
| *H04L 9/32* | (2006.01) | |

(52) U.S. Cl.
CPC ............ *H04L 9/0656* (2013.01); *G06F 21/70* (2013.01); *H04L 9/0643* (2013.01); *H04L 9/088* (2013.01); *H04L 9/0894* (2013.01); *H04L 9/3247* (2013.01); *H04L 9/3265* (2013.01); *H04L 2209/12* (2013.01)

(58) Field of Classification Search
CPC ..... H04L 9/0656; H04L 9/0643; H04L 9/088; H04L 9/0894; H04L 9/3247; H04L 9/3265; H04L 2209/12; G06F 21/70
USPC ........................................................ 713/190
See application file for complete search history.

(56) References Cited

U.S. PATENT DOCUMENTS

| | | | |
|---|---|---|---|
| 1,310,719 A | 7/1919 | Vernam | |
| 6,889,324 B1 * | 5/2005 | Kanai | .......... H04L 9/3247 380/246 |
| 8,214,653 B1 * | 7/2012 | Marr | ............. G06F 8/65 713/150 |
| 8,363,834 B1 | 1/2013 | Singhal | |
| 9,483,647 B2 | 11/2016 | Shah et al. | |

(Continued)

FOREIGN PATENT DOCUMENTS

| | | | | |
|---|---|---|---|---|
| CN | 102105883 A | * | 6/2011 | ........... G06F 21/572 |
| CN | 102823195 A | * | 12/2012 | ........... G06F 16/951 |

(Continued)

OTHER PUBLICATIONS

Falas et al., "A Hardware-based Framework for Secure Firmware Updates on Embedded Systems," 2019 IFIP/IEEE 27th International Conference on Very Large Scale Integration (VLSI-SoC), 2019, pp. 198-203, doi: 10.1109/VLSI-SoC.2019.8920348. (Year: 2019).*

(Continued)

*Primary Examiner* — Peter C Shaw
(74) *Attorney, Agent, or Firm* — Davis Wright Tremaine LLP

(57) ABSTRACT

A computing system receives encrypted data that can be decrypted by a first secret to obtain data, wherein the first secret is securely stored by the system, determines that the data encodes a second secret and executable code usable to perform cryptographic operations, and run the executable code to perform the cryptographic operations. The first secret may be a one-time pad.

20 Claims, 7 Drawing Sheets

(56) References Cited

U.S. PATENT DOCUMENTS

| | | | |
|---|---|---|---|
| 11,153,074 B1 | 10/2021 | Nikitas et al. | |
| 2002/0004784 A1 | 1/2002 | Forbes et al. | |
| 2006/0005046 A1* | 1/2006 | Hars | G06F 21/572 |
| | | | 714/E11.207 |
| 2006/0143600 A1* | 6/2006 | Cottrell | G06F 21/572 |
| | | | 717/168 |
| 2007/0074037 A1 | 3/2007 | Eckleder | |
| 2008/0256363 A1 | 10/2008 | Balacheff et al. | |
| 2010/0085075 A1* | 4/2010 | Luzzi | H04L 9/0866 |
| | | | 326/8 |
| 2010/0246811 A1* | 9/2010 | Sadler | G06F 21/6209 |
| | | | 726/2 |
| 2010/0246817 A1* | 9/2010 | Sadler | H04L 9/0863 |
| | | | 380/28 |
| 2010/0265617 A1 | 10/2010 | Isuyama | |
| 2011/0055585 A1 | 3/2011 | Lee | |
| 2012/0144204 A1* | 6/2012 | Litz | G06F 21/32 |
| | | | 713/186 |
| 2012/0331308 A1 | 12/2012 | Fernandez Gutierrez | |
| 2013/0036314 A1* | 2/2013 | Glew | G06F 21/86 |
| | | | 713/194 |
| 2014/0201518 A1* | 7/2014 | Yao | H04L 63/062 |
| | | | 713/155 |
| 2015/0106616 A1 | 4/2015 | Nix | |
| 2016/0306977 A1* | 10/2016 | Zarakas | G06F 8/654 |
| 2016/0315777 A1* | 10/2016 | Lloyd | H04L 9/3265 |
| 2017/0180137 A1* | 6/2017 | Spanier | H04L 9/3247 |
| 2018/0060561 A1* | 3/2018 | Pedersen | G06F 21/44 |
| 2018/0082065 A1 | 3/2018 | Liu et al. | |
| 2018/0275979 A1 | 9/2018 | Shepherd | |
| 2020/0076591 A1* | 3/2020 | Baker | H04L 63/0428 |
| 2020/0134185 A1* | 4/2020 | Cho | G06F 21/602 |
| 2021/0367781 A1* | 11/2021 | Wu | H04L 9/3247 |

FOREIGN PATENT DOCUMENTS

| | | | |
|---|---|---|---|
| CN | 106155725 A * | 11/2016 | |
| EP | 1973052 A1 * | 9/2008 | G06F 21/572 |
| JP | 2007041694 A * | 2/2007 | |
| WO | WO-2004021719 A1 * | 3/2004 | H04L 63/08 |
| WO | WO-2009062965 A2 * | 5/2009 | G06F 21/572 |
| WO | WO-2010095703 A1 * | 8/2010 | G11B 5/00808 |
| WO | WO-2017066409 A1 * | 4/2017 | G06F 21/45 |

OTHER PUBLICATIONS

Zandberg et al., "Secure Firmware Updates for Constrained IoT Devices Using Open Standards: A Reality Check," in IEEE Access, vol. 7, pp. 71907-71920, 2019, doi: 10.1109/ACCESS.2019.2919760. (Year: 2019).*

Falas et al., "A Modular End-to-End Framework for Secure Firmware Updates on Embedded Systems," arXiv:2007.09071v4, Oct. 1, 2021. (Year: 2021).*

Mtetwa et al., "Secure Firmware Updates in the Internet of Things: A survey," 2019 International Multidisciplinary Information Technology and Engineering Conference (IMITEC), Vanderbijlpark, South Africa, 2019, pp. 1-7, doi: 10.1109/IMITEC45504.2019.9015845. (Year: 2019).*

Wu et al., "Work-in-Progress: Measuring Security Protection in Real-time Embedded Firmware," 2022 IEEE Real-Time Systems Symposium (RTSS), Houston, TX, USA, 2022, pp. 495-498, doi: 10.1109/RTSS55097.2022.00050. (Year: 2022).*

Li et al., "Towards Fine-grained Fingerprinting of Firmware in Online Embedded Devices," IEEE INFOCOM 2018—IEEE Conference on Computer Communications, Honolulu, HI, USA, 2018, pp. 2537-2545, doi: 10.1109/INFOCOM.2018.8486326. (Year: 2018).*

Falas et al., "A Hardware-based Framework for Secure Firmware Updates on Embedded Systems," 2019 IFIP/IEEE 27th International Conference on Very Large Scale Integration (VLSI-SoC), Cuzco, Peru, 2019, pp. 198-203, doi: 10.1109/VLSI-SoC.2019.8920348. (Year: 2019).*

Ramachandran et al., "A remote attestation infrastructure for verifying the application of software updates," 2017 IFIP/IEEE Symposium on Integrated Network and Service Management (IM), Lisbon, Portugal, 2017, pp. 317-325, doi: 10.23919/INM.2017.7987294. (Year: 2017).*

Keleman et al., "Secure firmware update in embedded systems," 2019 IEEE 9th International Conference on Consumer Electronics (ICCE-Berlin), Berlin, Germany, 2019, pp. 16-19, doi: 10.1109/ICCE-Berlin47944.2019.8966174. (Year: 2019).*

Choi et al., "Secure firmware validation and update for consumer devices in home networking," in IEEE Transactions on Consumer Electronics, vol. 62, No. 1, pp. 39-44, Feb. 2016, doi: 10.1109/TCE.2016.7448561. (Year: 2016).*

Prada-Delgado et al., A. Vázquez-Reyes and I. Baturone, "Trustworthy firmware update for Internet-of-Thing Devices using physical unclonable functions," 2017 Global Internet of Things Summit (GIoTS), Geneva, Switzerland, 2017, pp. 1-5, doi: 10.1109/GIOTS.2017.8016282. (Year: 2017).*

IBM, "One Time Pad Digital Signature Technique", NN78081316, IBM Technical Disclosure Bulletin, Aug. 1978, 4 pages.

IBM, "Methods for Thwarting Corrupt Implementation of Data Encryption", NN9509345, IBM Technical Disclosure Bulletin, Sep. 1995, 3 pages.

Chen et al., "Public-Key Quantum Digital Signature Scheme with One-Time Pad Private-Key", Springer Science + Business Media, 10.1007/S11128-017-1778-5, Dec. 2017, pp. 1-14.

Shannon, "Communication Theory Secrecy Systems," The material in this paper appeared in a confidential report ,A Mathematical Theory of Cryptography, dated Sep. 1, 1946, which has now been declassified, 60 pages.

Cooper et al., "Internet X.509 Public Key Infrastructure Certificate and Certificate Revocation List (CRL) Profile," Request for Comments: 5280, Standards Track, May 2008, 141 pages.

Dang, "Recommendation for Applications Using Approved Hash Algorithms", NIST Special Publication 800-107 , Revision 1 , National Institute of Standards and Technology ( NIST ) , Aug. 2012 , retrieved on Nov. 24, 2015 , from http // csm.nist.gov / publications / nistpubs /800-107-rev1 / sp800-107-rev1.pdf , 25 pages.

* cited by examiner

TRUST FRAMEWORK AGAINST SYSTEMATIC CRYPTOGRAPHIC BREACH

CROSS-REFERENCE TO RELATED APPLICATION

This application is a divisional of U.S. patent application Ser. No. 16/011,230, filed on Jun. 18, 2018, entitled "TRUST FRAMEWORK AGAINST SYSTEMATIC CRYPTOGRAPHIC," the disclosure of which is hereby incorporated by reference in its entirety for all purposes.

BACKGROUND

Establishing and maintaining the security of computing devices over time is often challenging. In many cases, a device is provisioned to support state-of-the-art cryptographic algorithms at a first point in time. However, as time passes, vulnerabilities may be discovered in cryptographic algorithms that render the cryptographic algorithms less secure for various uses. Additionally, as computing resources become cheaper, faster, and more ubiquitous, a cryptographic algorithm may become less secure by virtue of brute force attacks that were once infeasible becoming practical to perform.

Furthermore, advances in quantum computing may present additional challenges, as the development of sufficiently powerful quantum computers may render certain cryptographic algorithms less secure. Securely updating a device to support more secure algorithms is highly complex and may require significant resources to be performed correctly. Accordingly, there exist many challenges around how to update cryptographic algorithms supported by a computing device after the device has been shipped to customers-even decades later when all cryptographic algorithms supported by the device are compromised or identified as being less secure.

BRIEF DESCRIPTION OF THE DRAWINGS

Various techniques will be described with reference to the drawings, in which.

DETAILED DESCRIPTION

Figure 1:
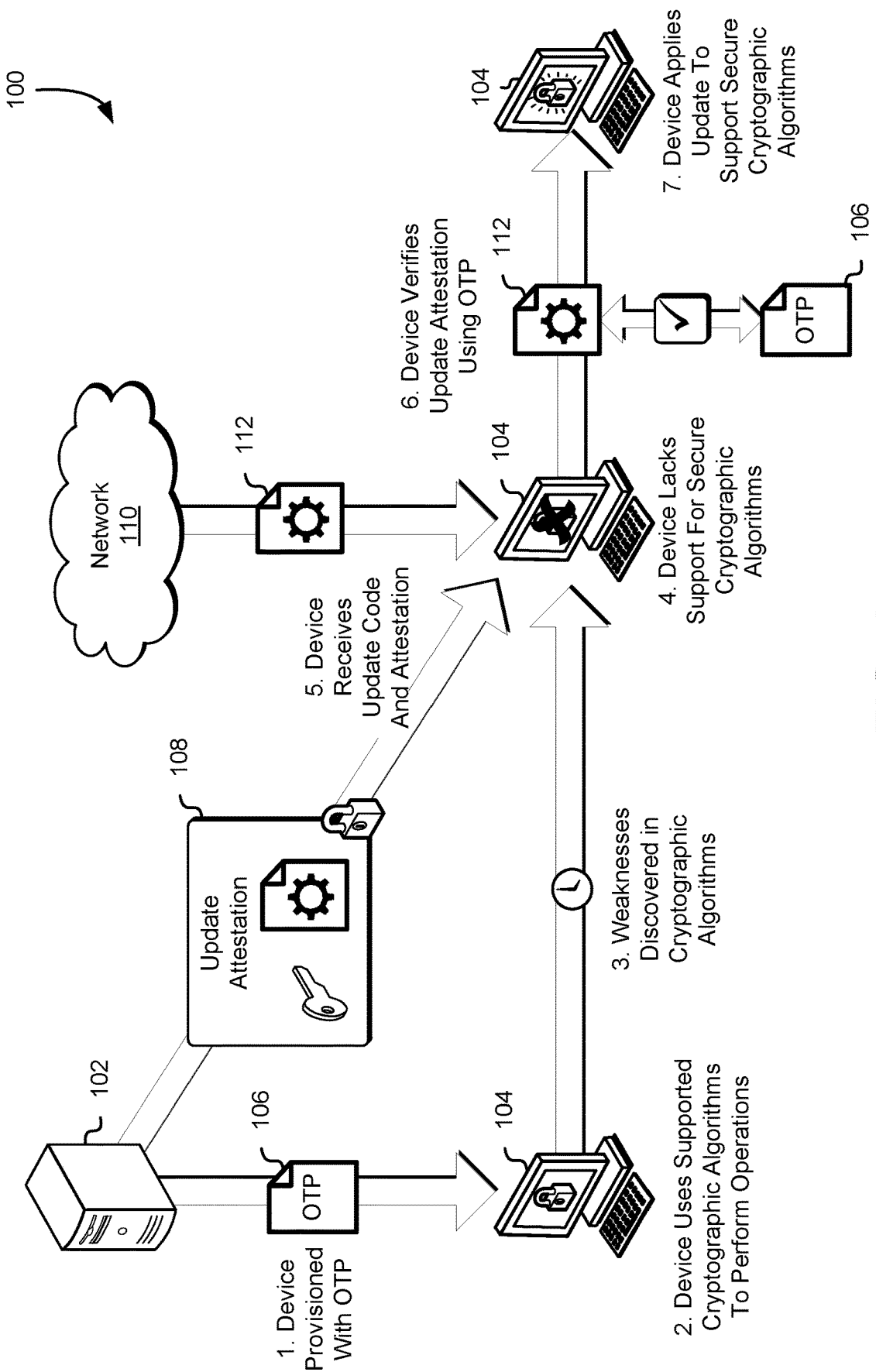
FIG. 1 illustrates a system in which one embodiment may be practiced.

In an embodiment, a hardware device is manufactured, shipped, and deployed at a first point in time, the device supporting a set of cryptographic algorithms which, at a later point in time, is deemed to be insecure (e.g., as a result of a vulnerability in the algorithm being discovered by researchers). In an embodiment, the result of a cryptographic algorithm being broken or otherwise discovered to be insecure, a trust chain which the device and software rely on for integrity and integrity verification is broken. In an embodiment, a one-time pad is used to deliver updated firmware to a deployed device. In an embodiment, a one-time pad is used by a first computing entity to generate an update attestation that can be used by a second computing entity to computationally verify the authenticity and integrity of a firmware update.

In an embodiment, when a hardware device receives a firmware update and update attestation, the system checks the signature on the software using a known certificate to validate its identity. In an embodiment, the system decrypts, using the one-time pad, the update attestation to check if the result has a prefix of a known byte sequence. In an embodiment, the known byte sequence is a preprogrammed constant, an offset substring of the one-time pad itself, or some derivative of the one-time pad. In an embodiment, the check succeeds and, in response, the delivered software wipes all previous code and security checks and replaces it with updated code that uses a cryptographic algorithm that is considered to be secure, which can be used to establish a trust anchor for the new trust regime.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

In an embodiment, a hardware device obtains a secret such as a one-time pad. In an embodiment, the secret is a cryptographic key that can be used in connection with a quantum-safe cryptographic algorithm. In an embodiment, the system obtains the one-time pad as part of a hardware manufacturing process. In an embodiment, the system includes a trust anchor such as a root certificate that is generated based on one or more of cryptographic algorithms supported by the device—for example, the root certificate may be self-signed according to a RSA-based algorithm.

In an embodiment, over the passage of time, some or even all of the cryptographic algorithms that the system was initially configured to support may be deprecated and/or no longer considered secure. In an embodiment, vulnerabilities may be discovered in cryptographic algorithms that render them insecure, advances in quantum computing technologies may render certain types of cryptographic algorithms that are not considered quantum-safe to be insecure, increases in processing power available to certain actors (e.g., state or state-sponsored actors) may render certain cryptographic algorithms to be considered in secure in light of the amount of time it is expected for such actors to succeed in a brute force attack, and more.

In an embodiment, the system receives or otherwise obtains executable code that can be used to update the hardware and/or software of the device to support additional cryptographic algorithms. In an embodiment, the system receives or otherwise obtains an attestation that the executable code is authentic. In an embodiment, the attestation refers to a digital signature or update attestation that provides computationally verifiable assurances of authenticity, integrity, confidentiality, as well as assurances that executable code associated with the plaintext is safe to execute, as described elsewhere in this disclosure. In an embodiment, the update attestation is encrypted using a one-time pad and encodes a hash output generated based on a cryptographic key and the executable code described above.

In an embodiment, the system verifies the integrity and authenticity of the executable code by decrypting the attestation. In an embodiment, the system has access to a plurality of one-time pads and selects a particular one-time pad based on an identifier that is supplied in connection with the attestation. In an embodiment, the system uses a one-time pad to decrypt the attestation, thereby obtaining a plaintext that is referred to verification data—it should be noted that the term "plaintext" as described is merely indicative of a relationship with a ciphertext and a cryptographic key (e.g., the one-time pad) and the plaintext may encode obfuscated data such as a hash output.

In an embodiment, the one-time pad is associated with a cryptographic key of a randomly-chosen size. In an embodiment, the system determines, based on the executable code and the cryptographic key, whether the obtained verification data matches an expected verification data. In an embodiment, the system performs the following steps: determines the one-time pad, the cryptographic key, and the executable code; concatenates the executable code with the cryptographic key to produce a concatenated data blob; computes a hash output using the concatenated data blob as a hash input to a cryptographic hash function; and compares an expected verification data value (e.g., the hash output value) to the obtained verification data value to determine whether the values match (e.g., whether they are identical). In an embodiment, a different algorithm is used to generate the expected verification data value, such as by iteratively hashing the concatenated data blob multiple times, by combining the executable code and the cryptographic key in a different manner (e.g., prepending, appending, or injecting the cryptographic key to a predetermined location of the executable code). In an embodiment, the manner in which the verification data may be generated is agreed upon between the hardware device and the manufacturer of the hardware device a priori (e.g., as part of provisioning the device).

In an embodiment, if the system determines that the attestation is authentic, the system runs the executable code. In an embodiment, the executable code, when executed, causes the system to support a cryptographic algorithm that is determined to be secure. In an embodiment, if the system determines the attestation is not authentic, the system discards the executable code by at least refuses to run it. In an embodiment, the system, in response to a threshold rate and/or number of failed update attempts, causes physical destruction of the one-time pad, such as by burning a fuse that is used to store the one-time pad.

As one skilled in the art will appreciate in light of this disclosure, certain embodiments may be capable of achieving certain advantages, including some or all of the following: improvements in the security of computer systems by enabling a computer system to be embed a reliable trust anchor to be used with as yet known algorithms, in the face of as yet unknown cryptographic compromises, to deliver a secure software update that reestablishes the trust regime. Techniques described herein improve the operation of computing devices by providing a process which can be used to re-establish a trust anchor for the device, even if some or all cryptographic algorithms supported by the device are compromised. In an embodiment, techniques described herein can be used to re-establish a trust anchor in a device that supports only RSA-based algorithms (e.g. cryptographic algorithms which are not quantum-safe), even under circumstances in which quantum computing is ubiquitous.

In an embodiment, FIG. 1 illustrates a diagram of a system 100 in which an embodiment in accordance with this disclosure can be implemented. In an embodiment, the system 100 includes a computing system 102 controlled by a manufacturer of a computing device 104 or other trusted entity. In an embodiment, the computing system 102 is a computing system that is utilized during a manufacturing process of a hardware computing device that provisions the device with a secret such as a one-time pad 106.

In an embodiment, the secret is a one-time pad 106 generated by the hardware manufacturer and the hardware device is provisioned by encoding the one-time pad (e.g., in an encrypted format) in a security module such as a hardware security module (HSM), trusted platform module (TPM), physically unclonable function (PUF), and more. In an embodiment, the one-time pad is physically protected by an enclosure that causes destruction of the one-time pad if the enclosure is broken or an attempt to physically inspect the one-time pad is detected. In an embodiment, the secret is destroyed by causing the computer system to be unable to use the secret to perform cryptographic operations (e.g. decryption of a ciphertext generated by the secret) such that the computer system is unable to unilaterally restore an ability to use the secret to perform the cryptographic operations. Physical inspection, in an embodiment, refers to having physical access to examine components that store the one-time pad, such by inspecting physical characteristics (e.g., using a voltmeter, electron microscope, or other apparatus usable to inspect physical properties that can be used to determine the value of the one-time pad). In an embodiment, the secret maintained in a hardware device (e.g., PUF) so as to be unobtainable to any processor executing code outside of the hardware device.

In an embodiment, the hardware device 104 is configured with the ability to perform physically destructive operations that cause the hardware device to become physically unable to perform operations using the secret. The hardware device, in an embodiment, is configured with circuitry that destroys one or more secrets. The secret, in an embodiment, is a hardware secret stored in programmable ROM (PROM). In an embodiment, circuitry enabling use of a hardware secret is equipped with one or more fuses that may be burned to render the hardware secret unusable to be used for passcode verification. Fuses, in some embodiments, are resettable while, in other embodiments, fuses are not resettable. In an embodiment, circuitry in the hardware device may be configured to pass a high voltage charge to a cryptographic processor, thereby rendering the cryptographic processor inoperable to utilize a hardware secret needed to perform cryptographic operations. Other variations are included in the scope of the present disclosure including, but not limited to, the use of thermal energy (e.g., extra thermal energy applied or by a lack of cooling, such as by causing a cooling fan to become inoperable) to destroy and/or deplete one or more hardware secrets and, generally, any manner by which physical destruction of the hardware secret is achievable. In an embodiment, the hardware secret is an electronically stored set of random bits that correspond to a one-time pad.

In an embodiment, the hardware device 104 is configured to support various cryptographic algorithms that can be used to perform various cryptographic operations such as encrypting and decrypting data, generating and verifying digital signatures, and more. In an embodiment, the hardware device is provisioned to support a set of cryptographic algorithms, such as RSA-based cryptographic algorithms. In an embodiment, at a later point in the weaknesses may be discovered in the cryptographic algorithms and/or the cryptographic algorithms may be determined to be unsafe for other reasons. In an embodiment, determining that a cryptographic algorithm is not secure is based on one or more criteria, such as based on the discovery of vulnerabilities in the cryptographic algorithm (e.g., SSL 3.0 may be considered insecure based on the discovery of the Padding Oracle On Downgraded Legacy Encryption (POODLE) attack rendered), based on improvements in computer technology (e.g., RSA may be considered insecure based on the development of a sufficiently powerful quantum computer), based on improvements in computing speed (e.g., a cryptographic algorithm may be considered insecure based on a decrease in the amount of time and/or financial cost involved in performing a brute force attack making the attack not impractical), and more.

In an embodiment, as a result of vulnerabilities being detected or discovered, cryptographic algorithms may be deprecated, and may be unusable for performing cryptographically protected communications with other computer systems, at least because other computer systems may be patched to refuse use of the insecure cryptographic algorithms. In an embodiment, the hardware device 104 lacks support for a secure cryptographic algorithm. In an embodiment, the trust regime of the hardware device 104 is broken because a trust anchor (e.g., a root certificate) is generated using a compromised cryptographic algorithm. Accordingly, the computing device, in an embodiment, is in a state where it is unable to re-establish a trust anchor, at least because a new root certificate that is received may suffer from the same vulnerabilities (e.g., the vulnerabilities may make it so that the root certificate can be easily forged by another party). In an embodiment, a trust anchor is an authoritative entity for which trust is assumed and not derived. In X.509 architecture, a root certificate would be the trust anchor from which the chain of trust is derived.

In an embodiment, a manufacturer of the hardware device or another suitable trusted entity authors and generates a firmware update 112 that, if executed by the hardware device 104, updates the firmware of the hardware device 104 to support secure cryptographic algorithms (e.g., newer cryptographic algorithms that may have been discovered or promulgated after the hardware device was manufactured and shipped).

In an embodiment, the update attestation 108—which may be referred to as a signature or digital signature elsewhere in this disclosure—refers to a data structure that a hardware device can use to verify authenticity and/or integrity of update code and make a determination as to whether to run executable code. In an embodiment, the update attestation is a computationally verifiable attestation that the firmware update 112 is authentic (e.g., the update code was created by a trusted party such as the manufacturer of the device) and that the update code was not modified, either intentionally (e.g., by a malicious party) or unintentionally (e.g., as a result of signal loss) from its original form. In an embodiment, the update attestation 108 is used to prevent code generated by unauthorized entities (e.g., hackers, malicious parties) from being executed by the hardware device 104.

In an embodiment, the update attestation 108 firmware update 112 is received by the hardware device 104 via a network 110. In an embodiment, the network 110 is a wireless network such as the Internet. In an embodiment, the hardware device 104 receives the update attestation 108 and/or the firmware update 112 over an insecure channel (e.g., a communications channel that does not provide cryptographically verifiable assurances of authenticity, integrity, and confidentiality). Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted. Confidentiality may refer to assurances that a message is not decipherable, absent extraordinary computational efforts (e.g., a brute force attack), by a party that lacks access to a secret.

In an embodiment, the system uses the one-time pad 106 to decrypt the update attestation 108 and verify that the received firmware update 112 is authentic based on the contents of the update attestation 108. In an embodiment, the hardware device 104 at least: obtains the firmware update 112 and the update attestation 108; decrypts the update attestation 108 using the one-time pad to obtain an integrity value; concatenates the obtained firmware update with a secret to generate a hash input; use the hash input and a cryptographic hash algorithm to generate a hash output; and determine that the hash output and the integrity value match. In an embodiment, the hash input is based on the firmware update and the secret (e.g., the secret is embedded at a predetermined location of the firmware update). In an embodiment, the secret is a cryptographic key of a randomly selected length (e.g., bit-length). In an embodiment, the secret is mapped to the one-time pad (e.g., via a data structure).

In an embodiment, the hardware device, after using the update attestation 108 to verify the authenticity and integrity of the received firmware update 112, runs the firmware update 112 which causes the system to support a secure cryptographic algorithm, re-establish a trust regime, etc. In an embodiment, the firmware update enables the computing device to perform cryptographic operations according to a secure cryptographic algorithm (e.g., a quantum-safe cryptographic algorithm that was not yet discovered and/or used in communications standards at the time that the hardware device 104 was manufactured). In an embodiment, the secure cryptographic algorithm is used to re-establish a trust anchor. In an embodiment, the firmware update 112 causes the system to generate a certificate chain, or a portion thereof, using the secure cryptographic algorithm.

Figure 2:
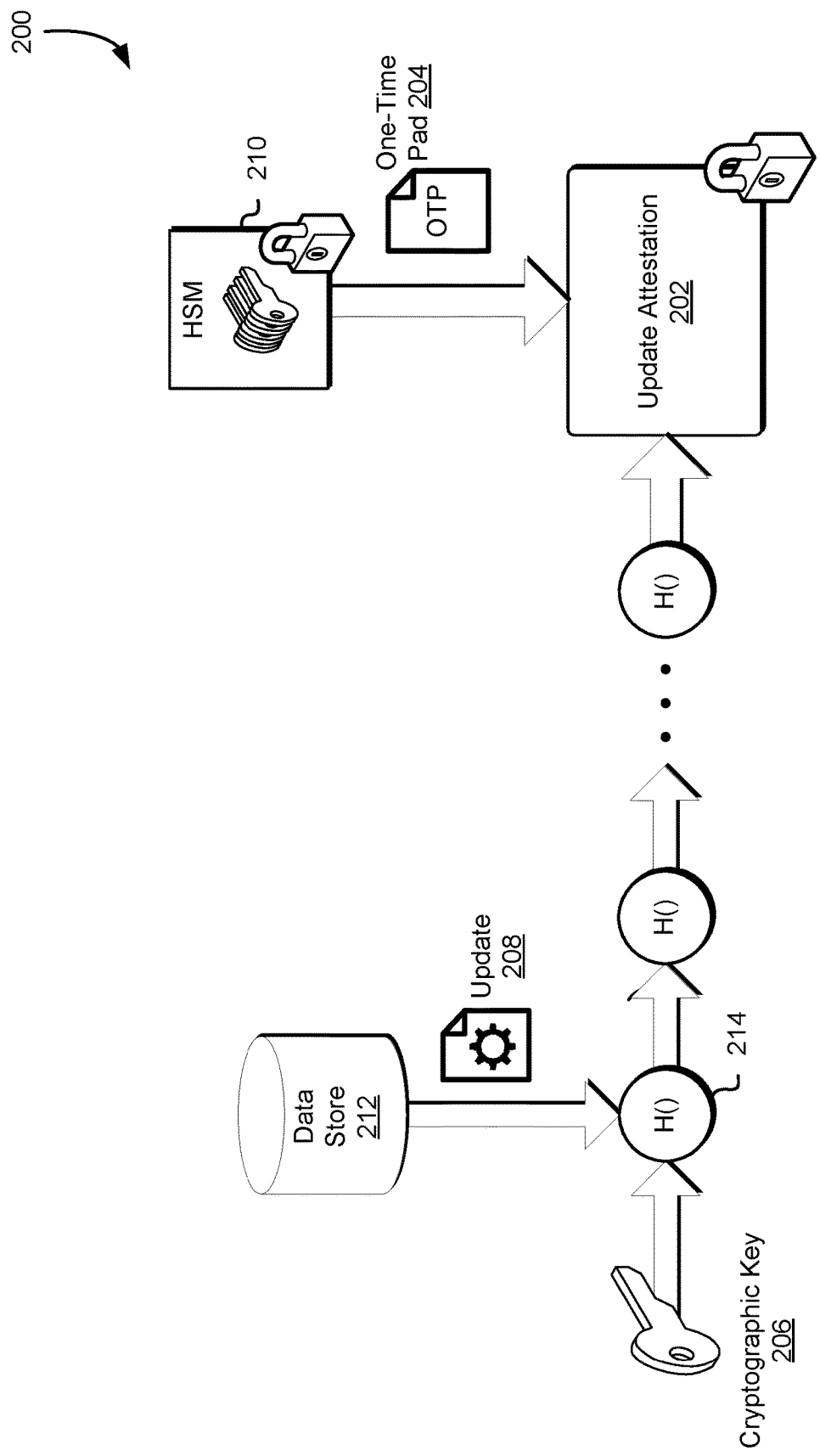
FIG. 2 illustrates a diagram of a system that generates an update attestation, in accordance with an embodiment.

In an embodiment, FIG. 2 illustrates a diagram of a system 200 in which an embodiment in accordance with this disclosure can be implemented. In an embodiment, the system 200 generates an update attestation 202 based on a one-time pad 204, a cryptographic key 206, and an update 208. In an embodiment, a hash function 214 is used to generate the update attestation 202. In an embodiment, the update 208 is obtained from a data store 212 and/or the one-time pad 204 is securely stored in a security module such as the hardware security module 210 illustrated in FIG. 2. In an embodiment, a hardware device manufacturer uses the system 200 to generate an update attestation 202 and provides the attestation to a hardware device in accordance with techniques disclosed in connection with FIG. 1.

In an embodiment, the update attestation 202—which may be referred to as a signature or digital signature elsewhere in this disclosure—refers to a data structure that a hardware device can use to verify authenticity and/or integrity of the update and make a determination as to whether to run executable code. In an embodiment, the update attestation is a computationally verifiable attestation that the update 208 is authentic (e.g., the update was created by a trusted party such as the manufacturer of the device) and that the update was not modified, either intentionally (e.g., by a malicious party) or unintentionally (e.g., as a result of signal loss) from its original form. The update attestation 202, in an embodiment, is used by the hardware device to determine that a firmware update is needed.

The one-time pad 204, in an embodiment, refers to a cryptographic secret that is shared between a hardware device and a second entity such as the manufacturer of the device or, more generally, any suitable entity that is trusted to generate executable code that the hardware device consumes. In an embodiment, a secret (e.g., a sequence of random bits used more than once) is utilized in place of the one-time pad 204 illustrated in FIG. 2. A one-time pad may refer to a secret key comprising a set of bits that is used to encrypt a plaintext, wherein the one-time pad is: generated randomly (as opposed to using a pseudo-random number generator); at least the same size as the plaintext; is not reused in whole or in part to encrypt a different plaintext (e.g., a second instance of the same plaintext can be encrypted without weakening the assurances of confidentiality described); and is kept secret from adversaries. In an embodiment, the one-time pad 204 is kept secret by making the one-time pad inaccessible to all entities except a secure module (e.g., a hardware security module) controlled by the manufacturer of a hardware device and a security module embedded in or otherwise controlled by a hardware device. In an embodiment, a one-time pad 204 has properties of perfect secrecy as described in accordance with "Communication Theory of Secrecy Systems" by Claude Shannon which is hereby incorporated by reference. A one-time pad is an example of a type of secret. In an embodiment, a secret can be used to encrypt between 1 and N different plaintexts, wherein N is selected based on the difficulty of determining a plaintext from its corresponding ciphertext generated from the secret. In an embodiment, a secret is generated using a random or pseudo-random number generator such as a cryptographically secure pseudorandom number generator (CSPRNG).

In an embodiment, the cryptographic key 206 is a secret key of a randomly or pseudo-randomly chosen size. In an embodiment, the secret is variable sized—meaning that a first secret used with a first one-time pad has a different size from a second secret used with a second one-time pad—thereby making it more difficult for an adversary (e.g., malicious party attempting to cause a computing device to run unauthorized code) to determine the structure of the data blob that is being signed. In an embodiment, the encryption with the one-time pad is important because it forces an attacker to not only find a hash collision where the input is having an unknown blob appended, but also when they have no information regarding the hash function output (e.g., the size of the hash output).

In an embodiment, the one-time pad 204 and the cryptographic key 206 form an associated pair of keys that are used together. In an embodiment, the firmware specifies which of a set of associated pairs of keys is to be used for verification. In an embodiment, the update attestation includes or otherwise encodes a key identifier associated with the one-time pad to be used for verification, thereby enabling a system to determine which one-time pad among a plurality of one-time pads should be used to verify the attestation. In an embodiment, some or all cryptographic keys associated with the plurality of one-time pads have different sizes.

In an embodiment, the update 208 is executable code such as a firmware update that includes executable code that, if executed by one or more processors of a computing device, enable to computing device to support one or more cryptographic algorithms to perform operations. In an embodiment, the update 208 is data such as a cryptographic key that can be used to enable to system to perform operations (e.g., encrypt and decrypt, generate and verify digital signatures). The update 208, in an embodiment, if executed on one or more processors of a computing device, can be used to establish or re-establish a trust anchor for the device. In an embodiment, the update 208 is executable code that can be executed by one or more processors of the hardware device. In an embodiment, the update 208 includes source code that can be interpreted or compiled by the hardware device to generate executable code that the device can execute using one or more processors.

In an embodiment, the one-time pad 204 is stored in a security module such as the hardware security module 210 illustrated in FIG. 2. In an embodiment, any suitable security module such as a hardware security module (HSM), trusted platform module (TPM), physically unclonable function (PUF), etc., is used to securely store the one-time pad 204. In an embodiment, secure storage of the one-time pad refers to securely maintaining secret information to which access, outside of a security module configured to perform calculations with the information, is extraordinarily difficult or even effectively impossible. In an embodiment, the one-time pad 204 is stored in one or more fuses that have the ability to be physically destroyed. In an embodiment, the one-time pad 204 is stored in a security module 210 whose physical destruction can occur in response to detecting an attempt to physically access the security module, in response to detecting a cryptographic attack (e.g., in response to detecting a rate and pattern of requests to use the security module in a manner that is indicative of a brute force attack).

In an embodiment, the update 208 is stored in a data store 212 or any other suitable data repository. The data store, in an embodiment, is a data storage service of a computing resource provider that is available over a network (e.g., accessible via a download link of an Internet website). In an embodiment, the update 208 is stored and access to the update 208 is controlled by the manufacturer of a hardware device. In an embodiment, the update 208 is stored in a plaintext format (e.g., not encrypted). In an embodiment, the data store 212 is implemented at least in part using persistent storage (e.g., hard disk drives), volatile storage, and more.

The update attestation 202 is generated, in an embodiment, by at least: generating a hash function input based on the cryptographic key 206 and the update 208 (e.g., by concatenating the update 208 and the cryptographic key 206); using a cryptographic hash function to generate a hash output from the hash input; and encrypting the hash output (or a quantity derived from the hash output), thereby generating the update attestation 202. In an embodiment, the cryptographic hash function 214 is a pre-image resistant function such as a one-way function. In an embodiment, the hash function is provided to the security module 210 with an instruction to use a particular one-time pad to use to encrypt the hash output. In an embodiment, encrypting the hash output does not expose the one-time pad 204 in a plaintext format outside of the security module.

In an embodiment, the hash function 214 is applied iteratively to generate the update attestation 202. In an embodiment, the system generates the hash output by concatenating the cryptographic key 206 and update 208 to generate a hash input and generating a hash output from the hash input using a cryptographic hash function 214 such as SHA256—denoted as $H(D|X)$ wherein D refers to the update 208, X refers to the cryptographic key 206, and H refers to the cryptographic hash function 214. In an embodiment, the hash output is generated by iteratively hashing the quantities described above—for example, by computing H(H(D|X)). In an embodiment, the hash output is generated by performing a cryptographic hash function iteratively a number of times, wherein the number is determined such that the expected time to compute the hash output is on the order of several seconds or even minutes. The number of times may, in an embodiment, be thousands or millions of iterations, so as to make it more difficult for a brute force attack to find a value of E such that H( . . . H(E|X) . . . )= H( . . . H(D|X) . . . ) wherein E is unauthorized code that an adversary wishes to inject into the hardware device. In an embodiment, the second secret is a secret cryptographic key of a randomly-chosen size. In an embodiment, the number of iterations or the expected duration of computing the update attestation 202 may be selected based on how frequently a device is expected to receive and apply updates. In an embodiment where the update is a firmware update, the updates are infrequent enough that taking several seconds or even minutes to generate the update attestation (e.g., as part of the verification process) is acceptable, as such a process, which takes more time to perform, makes it much more difficult for an attacker to find a way to bombard to device with phony firmware updates and brute force a signature. Having the delay separate from the signature verification algorithm itself opens up the possibility of an attacker finding a way to decouple the two so that they can attempt a vast number of signature guesses.

Pre-image resistant functions include one-way functions (i.e., functions that may not be computationally difficult to compute for a current value, but may not be computationally trivial to determine a previous value from the current value), having a recurrence relationship to a previous value of the function. The one-way membership function may not be mathematically proven/provable as one-way, but have computational complexity properties that render the function pre-image resistant. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that $f(x)=y$ is below a specified threshold), second pre-image resistance (given an input x1, the probability of randomly generating another input x2, different from x1, such that $f(x1)=f(x2)$ is below a specified threshold) and/or collision resistance (the probability of two different inputs resulting in the same output is less than a specified threshold). One-way functions suitable for use in generating an identifier for data include functions that satisfy properties of collision resistance (i.e., the probability of $f(x1)=f(x2)$ for different x1 and x2 is below a threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

Figure 3:
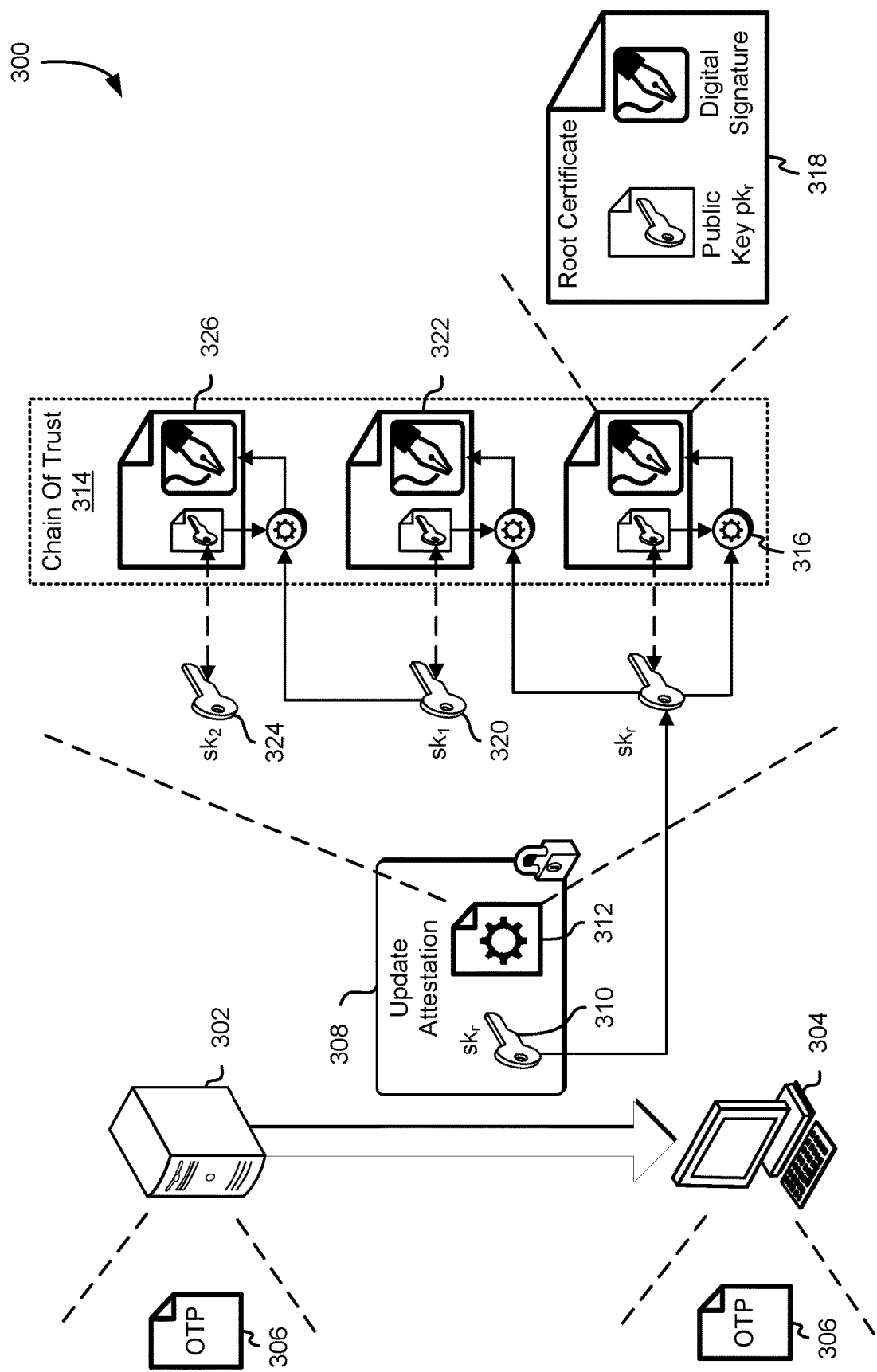
FIG. 3 illustrates a system in which a trust regime is established based on an update attestation, in which one embodiment may be practiced.

In an embodiment, FIG. 3 illustrates a diagram of a system 300 in which a trust regime is established based on an update attestation, in which one embodiment may be practiced. In an embodiment, the system 200 generates an update attestation 202 based on a one-time pad 204, a cryptographic key 206, and update 208. In an embodiment, a hash function 214 is used to generate the update attestation 202. In an embodiment, the update 208 is obtained from a data store 212 and/or the one-time pad 204 is securely stored in a security module such as the hardware security module 210 illustrated in FIG. 2.

FIG. 3 illustrates a system 300 in which a trust regime is established based on an update attestation, in which one embodiment may be practiced. In an embodiment, the system 300 includes a computer system 302 (e.g., a computer system controlled by a manufacturer of the computing device), a computing device 304, and a one-time pad 306 accessible by both the computing system 302 and the computing device 304.

In an embodiment the computing system 302 is a computing system under the control of the manufacturer of the computing device 304. In an embodiment, the computing device 304 is manufactured and then shipped to a customer that subsequently controls use of the computing device 304. In an embodiment, the one-time pad 306 is securely stored in a HSM, TPM, PUF, fuse, or other secure storage device.

In an embodiment, an update attestation 308 is generated and provided to the computing device 304 in response to determining that a cryptographic algorithm is not secure. In an embodiment, determining that a cryptographic algorithm is not secure is based on one or more criteria, such as based on the discovery of vulnerabilities in the cryptographic algorithm (e.g., SSL 3.0 may be considered insecure based on the discovery of the Padding Oracle On Downgraded Legacy Encryption (POODLE) attack rendered), based on improvements in computer technology (e.g., RSA may be considered insecure based on the development of a sufficiently powerful quantum computer), based on improvements in computing speed (e.g., a cryptographic algorithm may be considered insecure based on a decrease in the amount of time and/or financial cost involved in performing a brute force attack making the attack not impractical), and more. In an embodiment, the system furthermore determines that all cryptographic algorithms supported by the hardware device to perform cryptographic operations are not considered to be secure.

In an embodiment, the update attestation 308 includes information (e.g., a hash output) that encodes a secret 310 and update code 312. In an embodiment, the secret 310 is a cryptographic key whose bit-length is not made available (e.g., based on publicly available information such as protocol documentation) and the update code 312 is executable code that, if executed, performs a firmware update to support a secure cryptographic algorithm. In an embodiment, the computing device 304 is manufactured and shipped with support for a set of cryptographic algorithms, and over time, vulnerabilities are discovered that render some or all of the set of cryptographic algorithms unusable for cryptographically protected communications (e.g., communications with cryptographically verifiable assurances of authenticity, integrity, and/or confidentiality). In an embodiment, a firmware update is generated to mitigate discovered vulnerabilities (e.g., the firmware update patches the vulnerability, includes support for a different cryptographic algorithm). In an embodiment, the update attestation 308 is encrypted using the one-time pad (e.g., using a bit-wise XOR encryption).

In an embodiment, the computing device 304 receives the update attestation 308 and obtains the update code (not illustrated in FIG. 3) via a network such as the Internet. In an embodiment, the computing device 304 verifies validity of the update attestation according to a process in accordance with those described in connection with FIG. 6. In an embodiment, the system validates that the update attestation 308 is authentic and runs the firmware update, thereby updating firmware used by the computing device to support a secure cryptographic algorithm (e.g., a cryptographic algorithm that is deemed to be secure by communities of academics, researchers, software developers, cryptographic experts, and/or other reputable sources). In an embodiment, the secret 310 is used to establish a chain of trust 314.

FIG. 3 illustrates, in accordance, a certificate chain that establishes or re-establishes a chain of trust for the computing device 304. The certificate chain shown in FIG. 3 includes three certificates: an end-entity certificate 326, an intermediate certificate 322, and a root certificate 318. In an embodiment, a certificate includes various fields such as the subject of the certificate, the issuer of the certificate, and subject public key information that may further include a subject public key and information regarding the subject public key such as the key type and the key size. The certificates, in an embodiment, are X.509 v3 certificates in accordance with RFC 5280 which is hereby incorporated to this document by reference.

The root certificate 318, in an embodiment, is a certificate that is self-issued by a certificate authority associated with the root certificate, such as the manufacturer of the computing device or components thereof. In an embodiment, the root certificate includes a digital signature that is digitally signed using the private key $sk_r$ 310 using a function 316 that is secure. In an embodiment, the computing device 304 supports the function as a result of applying the update code 312. Non-limiting examples of functions that generate digital signatures include: Elliptic Curve Digital Signature Algorithm (ECDSA); Digital Signature Algorithm (DSA); RSA Probabilistic Signature Scheme (RSA-PSS); and more. In an embodiment, the Subject field and the Issuer field of the root certificate refer to the same entity. In an embodiment, additional information is included in the certificate to indicate that a certificate is a root certificate. In an embodiment, a root certificate 318 in accordance with the X.509 v3 standard includes a basicConstraints field that further includes a cA field being TRUE. In an embodiment, the computer device 304 is initially provisioned (e.g., during the manufacturing of the computing device) with one or more root certificates that are trusted that are signed using cryptographic algorithms that are, over time, compromised and deemed insecure. In an embodiment, a system administrator provisions the computing device 304 to include additional trusted certificates, such as a root certificate that is issued by an organization's internal certificate authority. An organization's internal certificate authority, in an embodiment, is trusted by computing devices that are provision by the organization but not necessarily trusted by device that have not been provisioned by the organization. The secret key $sk_r$ 310, in an embodiment, is a private key (or is used to derive a private key, such as by using PBKDF2) that is used to digitally sign the intermediate certificate 322, and the subject public key $pk_r$ (i.e., the public key corresponding to the private key $sk_r$) included in the root certificate 318 can be used to cryptographically verify the authenticity of the digital signature generated over the intermediate certificate 322.

The intermediate certificate 322, in an embodiment, is a digital certificate that is issued, either directly or indirectly, by a trusted certificate authority. The intermediate authority associated with the intermediate certificate 322, in an embodiment, has access to a private key $sk_1$ 320 corresponding to the public key $pk_1$ of the intermediate certificate. The intermediate authority's private key $sk_1$ 320, in an embodiment, is used to digitally sign the end-entity certificate 326, and the intermediate certificate 322 can be used to cryptographically verify the digital signature by performing a signature verification using the subject public key of the intermediate certificate 322. In an embodiment, the Subject field of the intermediate certificate 322 and the Issuer field of the end-entity certificate 326 match (i.e., the issuer field of a first certificate matches the subject field of a second certificate where the second certificate is associated with the entity that digitally signed the first certificate).

An end-entity certificate 326, in an embodiment, refers to a certificate that includes a public key $pk_2$ that has a corresponding private key which is used as part of a cryptographically protected communication. In an embodiment, the end-entity certificate includes a public key of the computing device 304, wherein the public key has a corresponding private key $sk_2$ 324 that the computing device 304 is able to use to establish its identity. In an embodiment, the end-entity certificate 326 is used by the computing device 304 as part of a TLS handshake process to establish a TLS session. The Subject field of the certificate may be an identifier that refers to the entity associated with the certificate. The Issuer field of the certificate may refer to the entity that digitally signed the certificate. In some embodiments, the issuer identified in the Issuer field may be an intermediate authority or may be a root authority for a certificate chain. A certificate may further include information regarding the subject's public key information. The SubjectPublicKeyInfo field may include two subfields—a Key field which includes a bitstream of the cryptographic public key of the subject, and an Algorithm field which identifies the public key algorithm of the subject public key. In an embodiment, the algorithm "RSA-2048" refers to the subject public key being a 2048-bit RSA public key.

In an embodiment, a valid chain of trust 314 exists from the end-entity certificate 326 to the root certificate 318 and the validity of the chain can be cryptographically verified. In an embodiment, a verification of the chain of trust 314 can be performed by at least: obtaining an end-entity certificate and verifying the digital signature of the end-entity certificate using the public key of the issuer of the end-entity certificate. In turn, the issuer certificate (e.g., the intermediate certificate 322) is obtained in an embodiment and the digital signature of the issuer certificate is verified in the same manner as described above. In an embodiment, these steps are repeated until a certificate signed by a root authority (e.g., the root certificate 318) is obtained. In an embodiment, the root certificate 318 acts as the trust anchor for the certificate chain.

In an embodiment, the digital signature of the root certificate is verified using the public key contained within the root certificate, and a verification may be performed to check that the root certificate is included in a list of trusted root certificates (e.g., a list of trusted certificates that is provisioned at least in part by a system administrator).

It should be noted that while one intermediate certificate is shown in the certificate chain discussed in connection with an embodiment in accordance with FIG. 3, in some embodiments there is a greater or fewer number of intermediate authorities. In an embodiment, an end-entity certificate directly chains to a root certificate (e.g., where an end-entity certificate is digitally signed by a root authority). In an embodiment, an end-entity certificate is digitally signed by a first intermediate authority, the certificate of the first intermediate authority digitally signed by a second intermediate authority, and the certificate of the second intermediate authority digitally signed by a root authority. In an embodiment, a certificate chain includes even more intermediate certificates.

Figure 4:
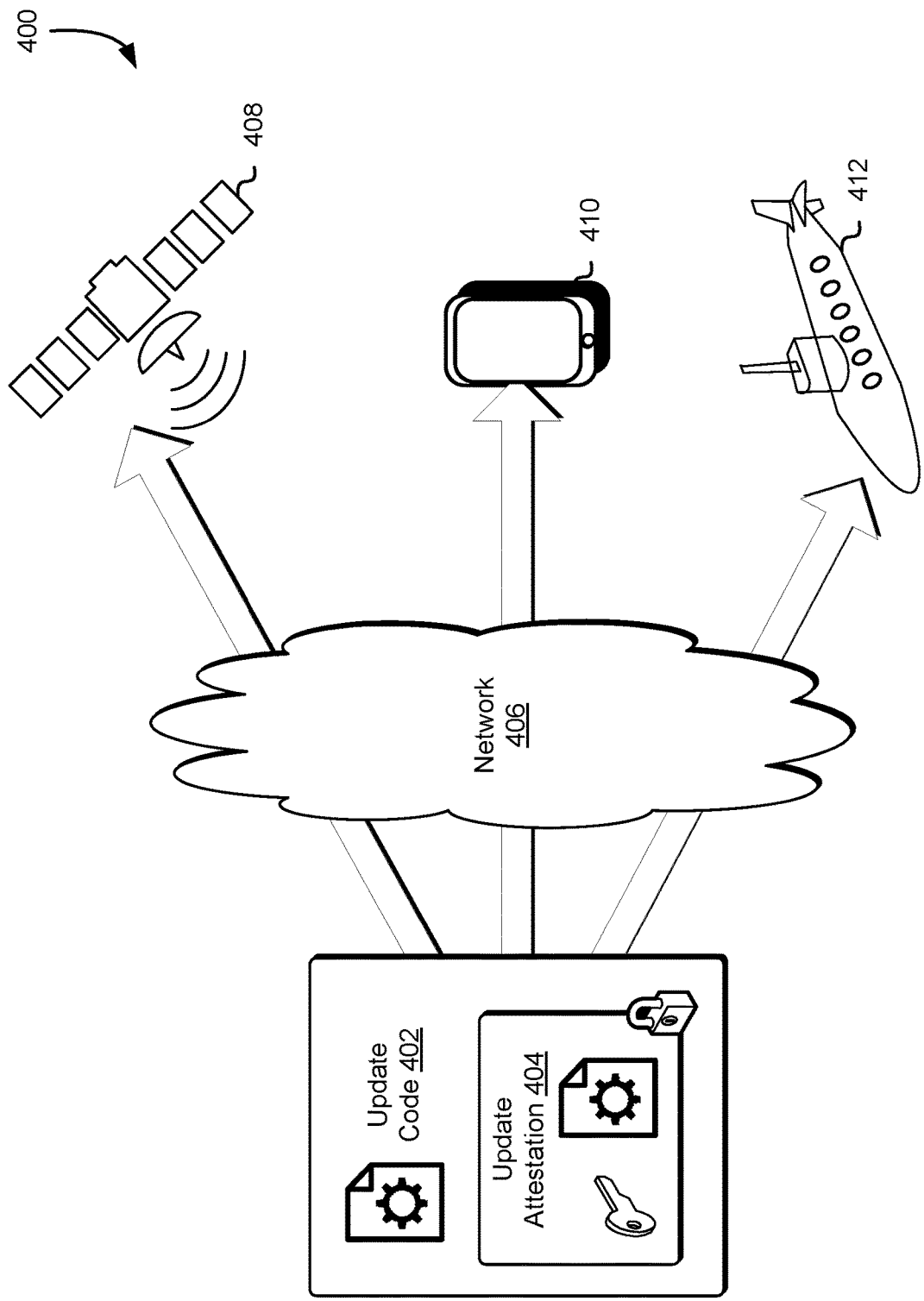
FIG. 4 illustrates a system in which one embodiment may be practiced.

FIG. 4 illustrates a system in which one embodiment may be practiced. In an embodiment, the system 400 includes update code 402 (e.g., a firmware update) that is distributed to various hardware computing devices.

In an embodiment, the update code 402 is executable code that, if executed by a hardware device, updates the firmware of the hardware device to establish and/or re-establish a trust anchor. In an embodiment, the update code 402, when applied, enables the device to perform cryptographic operations according to a cryptographic algorithm. In some cases, the cryptographic algorithm is developed, promulgated, adopted as a standard, or otherwise made usable at a point in time subsequent to when a hardware device is manufactured, deployed, installed, launched into orbit, or otherwise physically displaced. In an embodiment, the update attestation 404 is in accordance with those described elsewhere in this disclosure and is used to establish the authenticity and/or integrity of update code that is received by a computing device. In an embodiment, the update code 402 and the update attestation 404 is transmitted over a network 406 to one or more hardware computing devices. In an embodiment, the update code 402 and update attestation 404 are transmitted separately over the network. In an embodiment, the network is a wireless transmission medium.

In an embodiment, a hardware computing device is provisioned with a one-time pad at a first point in time and at a later point in time, is not, practically speaking, physically accessible by the manufacturer or another trusted entity. Physical accessibility may refer to there not being a practical way for a trusted entity to access the computing device—for example, a first computing device 408 may be a satellite that is in geosynchronous orbit around Earth or another celestial body—and, accordingly, the use of a wireless communications may be the only practical manner in which the update code 402 can be delivered to the computing device. Techniques described herein improve the operation of computing devices by providing a process which can be used to re-establish a trust anchor for the device, even if some or all cryptographic algorithms supported by the device are compromised. In an embodiment, techniques described herein can be used to re-establish a trust anchor in a device that supports only RSA-based algorithms (which are not quantum-safe), even under circumstances in which quantum computing is ubiquitous.

In an embodiment, a hardware computing device such as the computing devices 408-412 illustrated in FIG. 4 securely stores a one-time pad that can be used to validate authenticity of the update attestation 404. In an embodiment, the same one-time pad is shared between two or more hardware computing devices. In an embodiment, each one-time pad is uniquely associated with a single computing device.

In an embodiment, the update code 402 and update attestation 404 are transmitted to a mobile computing device 410 such as a smartphone in which it may be difficult and/or impractical to obtain physical access to the mobile computing device 410. In an embodiment, the mobile computing device 410 can be physically moved to a remote location such that it is difficult, impractical, and/or inconvenient for the owner of the mobile device to physically travel to a geographical location for the sole purpose of administering a firmware update. In an embodiment, a third hardware computing device 412 is a computer system within a submarine or underwater apparatus (e.g., an embedded sensor attached to an underwater pipe) that makes it impractical to provide firmware updates without the use of a wireless transmission medium.

Figure 5:
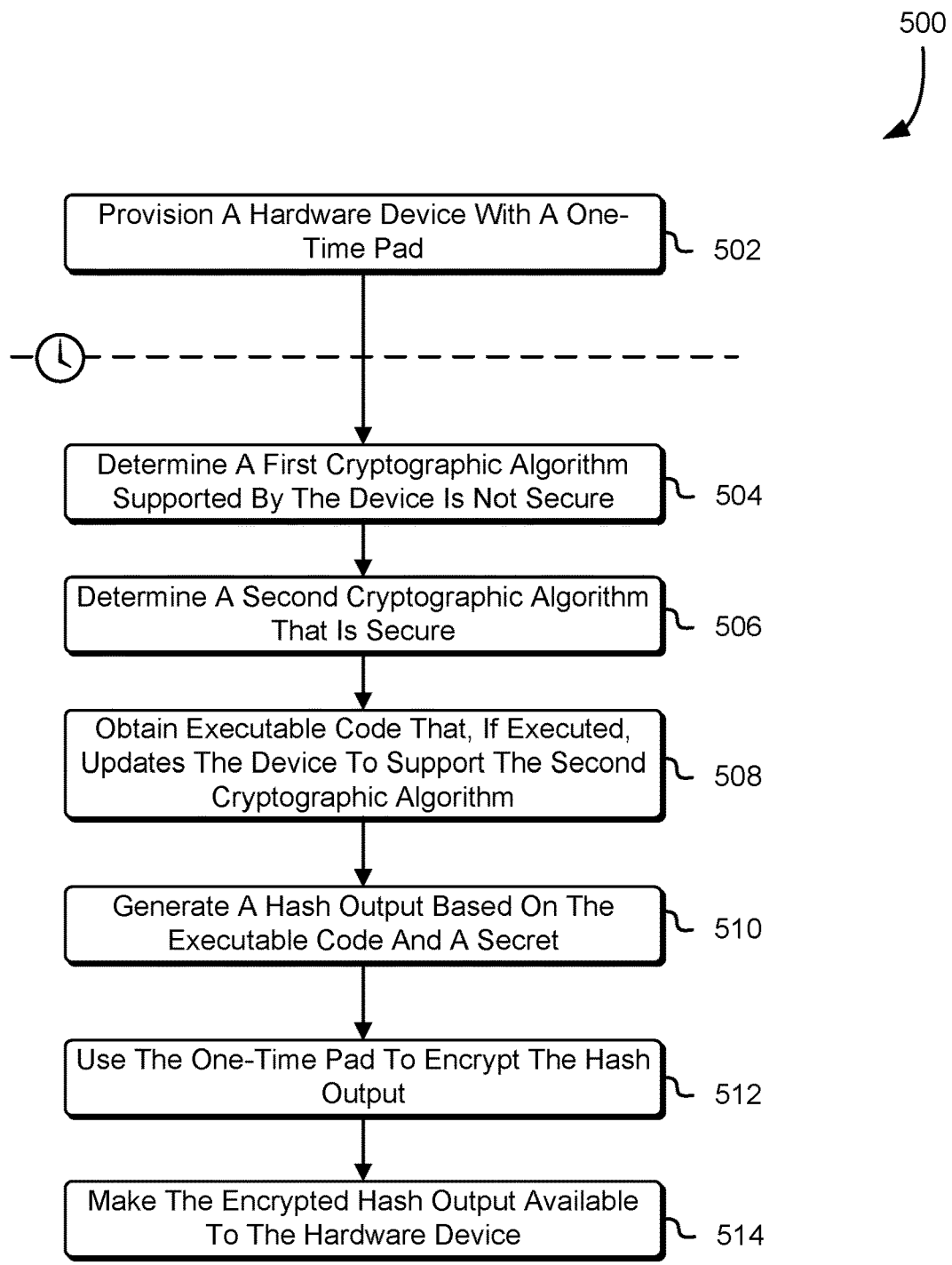
FIG. 5 illustrates process for provisioning a device to receive an update, in accordance with an embodiment.

FIG. 5 shows an illustrative example of a process 500 for provisioning a device to receive an update, in accordance with an embodiment. Some or all of the process 500 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 500 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. The process 500 may be performed by any suitable system, such as a system or computing environment connected to the manufacturing and/or provisioning of computing hardware. In an embodiment, the process 500 is performed in connection with a process described in accordance with FIG. 6.

In an embodiment, the process 500 is performed by or on behalf of a manufacturer of computing hardware and may be performed at least in part by computers that control or are used as part of the assembly of computing hardware on an assembly line. In an embodiment, the system provisions 502 a hardware with a secret such as a one-time pad.

A one-time pad may refer to a secret key comprising a set of bits that is used to encrypt a plaintext, wherein the one-time pad is: generated randomly (as opposed to using a pseudo-random number generator); at least the same size as the plaintext; is not reused in whole or in part to encrypt a different plaintext (e.g., a second instance of the same plaintext can be encrypted without weakening the assurances of confidentiality described); and is kept secret from adversaries. In an embodiment, the one-time pad is kept secret by making the one-time pad inaccessible to all entities except a secure module (e.g., a hardware security module) controlled by the manufacturer of a hardware device and a security module embedded in or otherwise controlled by a hardware device. In an embodiment, a one-time pad has properties of perfect secrecy as described in accordance with "Communication Theory of Secrecy Systems" by Claude Shannon which is hereby incorporated by reference. A one-time pad is an example of a type of secret. In an embodiment, a secret can be used to encrypt between 1 and N different plaintexts, wherein N is selected based on the difficulty of determining a plaintext from its corresponding ciphertext generated from the secret. In an embodiment, a secret is generated using a random or pseudo-random number generator such as a cryptographically secure pseudorandom number generator (CSPRNG).

The dotted line between step 502 and 504 represents a passage of time. In an embodiment, the passage of time may be several years, over which it may be the case that vulnerabilities of cryptographic algorithms may be identified. In an embodiment, the system determines 504 that a first cryptographic algorithm supported by the device is not secure. For example, cryptographic schemes that are based on RSA cryptography may be considered insecure after several years and due an increased availability of quantum computing resources. In an embodiment, the first cryptographic algorithm is used to generate a trust anchor of the hardware device, such as a root certificate. In an embodiment, the determination that the first cryptographic algorithm is not secure can be based on one or more criteria, such as based on the discovery of vulnerabilities in the cryptographic algorithm (e.g., SSL 3.0 may be considered insecure based on the discovery of the Padding Oracle On Downgraded Legacy Encryption (POODLE) attack rendered), based on improvements in computer technology (e.g., RSA may be considered insecure based on the development of a sufficiently powerful quantum computer), based on improvements in computing speed (e.g., a cryptographic algorithm may be considered insecure based on a decrease in the amount of time and/or financial cost involved in performing a brute force attack making the attack not impractical), and more. In an embodiment, the system furthermore determines that all cryptographic algorithms supported by the hardware device to perform cryptographic operations are not considered to be secure.

In an embodiment, the system determines 506 a second cryptographic algorithm, wherein the second cryptographic algorithm is considered secure. It should be noted that the second cryptographic algorithm being considered secure does not necessarily mean that the second cryptographic algorithm is mathematically proven to be secure, but rather that the second cryptographic algorithm is generally considered to be secure for the particular use cases, which may be a determination that is made based on the consensus of computer security professionals such as software engineers, computer security experts, cryptography experts, academics, and more. In an embodiment, the second cryptographic algorithm is invented or discovered at some point in time after the hardware device was first provisioned with the secret.

The system, in accordance with one embodiment, obtains 508 executable code that, if executed, by one or more processors of the hardware device, cause the hardware device to support the second cryptographic algorithm. In an embodiment, the executable code is a security update such as a firmware update. The firmware update, in an embodiment, includes executable code that updates the firmware used by one or more processors used by the hardware device to perform cryptographic operations. In an embodiment, the system obtains an update that, if applied to the hardware devices, enables the device to perform operations. In an embodiment the update includes data, executable code, or a combination thereof.

In an embodiment, the system generates 510 a hash output based on the executable code and a second secret. In an embodiment, the second secret does not possess the characteristics of a one-time pad. In an embodiment, the second secret is securely stored on the hardware device. In an embodiment, the system generates the hash output by concatenating the executable code and the second secret to generate a concatenated data blob and hashing the concatenated data blob using a cryptographic hash algorithm such as SHA256—denoted as $H(D|X)$ wherein D refers to the executable code, X refers to the second secret, and H refers to the cryptographic hash function. In an embodiment, the hash output is generated by iteratively hashing the quantities described above—for example, by computing $H(H(D|X))$. In an embodiment, the hash output is generated by performing a cryptographic hash function iteratively a number of times, wherein the number is determined such that the expected time to compute the hash output is on the order of several seconds or even minutes. The number of times may, in an embodiment, be thousands or millions of iterations, so as to make it more difficult for a brute force attack to find a value of E such that $H( \ldots H(E|X) \ldots )= H( \ldots H(D|X) \ldots )$ wherein E is unauthorized code that an adversary wishes to inject into the hardware device. In an embodiment, the second secret is a secret cryptographic key of a randomly-chosen size.

In an embodiment, the system uses 512 the one-time pad to encrypt the hash output, thereby generating a ciphertext. In an embodiment, the ciphertext is generated by performing an encryption operation using a secret as a cryptographic key and a plaintext, such as by performing a bitwise exclusive-or (XOR) of a plaintext with a secret, which may be referred to as XOR encryption. The ciphertext generated as a result of encrypting the plaintext (e.g., hash output) using the cryptographic key (e.g., one-time pad) may be referred to as a digital signature or update attestation that provides cryptographically verifiable assurances of authenticity, integrity, confidentiality, as well as assurances that executable code associated with the plaintext is safe to execute.

The system, in an embodiment, makes the encrypted hash output available 514 by transmitting the encrypted hash output over any suitable network, such as a wireless network. In an embodiment, the network that is used to transmit the encrypted hash output is not secure insofar as there are no assurances against another entity having the ability to eavesdrop on transmissions across the network and/or modify the data of transmissions across the network—however, it should be noted that such tampering is detectable by the intended recipient of the transmission (e.g., a party in possession of the one-time pad) and such a message may be discarded.

Figure 6:
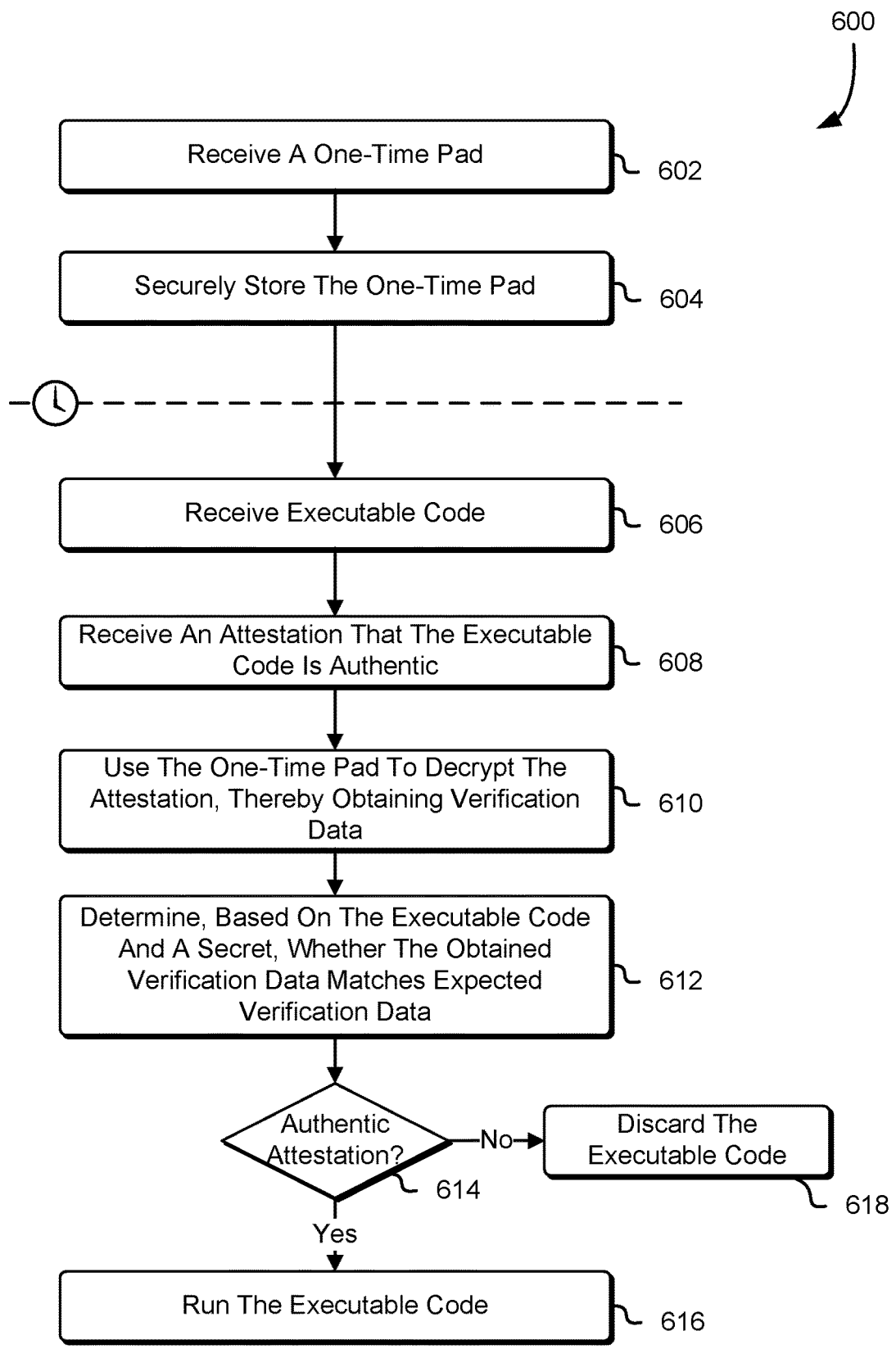
FIG. 6 illustrates process for provisioning a device to receive an update, in accordance with an embodiment.

FIG. 6 shows an illustrative example of a process 600 for provisioning a device to receive an update, in accordance with an embodiment. Some or all of the process 600 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 600 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. The process 600 may be performed by any suitable system, such as a hardware device that is capable of securely storing a secret such as a one-time pad. The system that performs the process 600 may be in accordance with those described elsewhere in this disclosure, such as those discussed in connection with FIG. 4. In an embodiment, the system is a hardware device in which it is difficult and/or impractical for an authorized party to physically access—the system may be a satellite in geosynchronous orbit of a celestial body, a computing device in a submarine, an embedded device in a difficult-to-reach geographical location (e.g., inside or nearby a volcano, embedded in the ocean floor), a micro- or nano-scale device embedded a living organism such as a human or pet animal, and more. In an embodiment, the process 600 is performed in connection with a process described in accordance with FIG. 5.

In an embodiment, the system receives 602 a secret such as a one-time pad. In an embodiment, the system receives the secret as part of a hardware manufacturing process. In an embodiment, the system, in response to receiving the secret, securely stores 604 the secret. In an embodiment, the secret is physically protected by an enclosure that causes destruction of the one-time pad if the enclosure is broken or an attempt to physically inspect the secret is detected. In an embodiment, the secret is destroyed by causing the computer system to be unable to use the secret to perform cryptographic operations (e.g. decryption of a ciphertext generated by the secret) such that the computer system is unable to unilaterally restore an ability to use the secret to perform the cryptographic operations. Physical inspection, in an embodiment, refers to having physical access to examine components that store the secret, such by inspecting physical characteristics (e.g., using a voltmeter, electron microscope, or other apparatus usable to inspect physical properties that can be used to determine the value of the secret). In an embodiment, the secret maintained in a hardware device (e.g., PUF) so as to be unobtainable to any processor executing code outside of the hardware device. In an embodiment, the system is configured to support one or more cryptographic algorithms to perform cryptographic operations such as encryption and decryption. In an embodiment, the system includes a trust anchor such as a root certificate that is generated based on one or more of the cryptographic algorithms—for example, the root certificate may be self-signed according to one of the cryptographic algorithms.

The dotted line between step 604 and 606 represents a passage of time. In an embodiment, the passage of time may be several years, over which it may be the case that vulnerabilities of cryptographic algorithms may be identified. In an embodiment, over the passage of time, some or even all of the cryptographic algorithms that the system was initially configured to support may be deprecated and/or no longer considered secure. In an embodiment, vulnerabilities may be discovered in cryptographic algorithms that render them insecure, advances in quantum computing technologies may render certain types of cryptographic algorithms that are not considered quantum-safe to be insecure, increases in processing power available to certain actors (e.g., state or state-sponsored actors) may render certain cryptographic algorithms to be considered in secure in light of the amount of time it is expected for such actors to succeed in a brute force attack, and more.

In an embodiment, the system receives 606 or otherwise obtains executable code. In an embodiment, the executable code is a firmware update. In an embodiment, the system receives the executable code over a network such as the Internet from the manufacturer. In an embodiment, the system obtains the executable code over the network from another entity, such as a third-party file host, a distributed network, a peer-to-peer file sharing service. In an embodiment, the system receives the executable code in response to a user-initiated action, wherein a user of the hardware device submits commands that cause the system to obtain the executable code, such as by using a web browser to navigate to the manufacturer's website to download security updates.

In an embodiment, the system receives 608 or otherwise obtains an attestation that the executable code is authentic. In an embodiment, the attestation refers to a digital signature or update attestation that provides cryptographically verifiable assurances of authenticity, integrity, confidentiality, as well as assurances that executable code associated with the plaintext is safe to execute, as described elsewhere in this disclosure. In an embodiment, the system receives or otherwise obtains the attestation from an entity that is different from the entity that the system received or otherwise obtained the executable code from. In an embodiment, the attestation is an update attestation that comprises a hash output. In an embodiment, the attestation is a ciphertext that is decryptable using the one-time pad. In an embodiment, the attestation includes a plaintext identifier associated with the one-time pad that can be used to decrypt the ciphertext.

In an embodiment, the system decrypts 610 the attestation. In an embodiment, the system has access to a plurality of one-time pads and selects a particular one-time pad based on an identifier that is supplied in connection with the attestation. In an embodiment, the system uses a secret (e.g., the selected one-time pad) to decrypt the attestation, thereby obtaining a plaintext that is referred to verification data—it should be noted that the term "plaintext" as described is merely indicative of a relationship with a ciphertext and a cryptographic key (e.g., the one-time pad) and the plaintext may encode obfuscated data such as a hash output.

In an embodiment, the one-time pad is a first secret and a second secret is linked or otherwise associated with the one-time pad. In an embodiment, the second secret is a secret cryptographic key of a randomly-chosen size. In an embodiment, the system determines 612, based on the executable code and the second secret, whether the obtained verification data matches an expected verification data. In an embodiment, the system performs the following steps: determines the first secret (e.g., the one-time pad), a second secret associated with the first secret, and the executable code; concatenates the executable code with the second secret to produce a concatenated data blob; computes a hash output using the concatenated data blob as a hash input to a cryptographic hash function; and compares an expected verification data value (e.g., the hash output value) to the obtained verification data value to determine whether the values match (e.g., whether they are identical). In an embodiment, a different algorithm is used to generate the expected verification data value, such as by iteratively hashing the concatenated data blob multiple times, by combining the executable code and the second secret in a different manner (e.g., prepending, appending, or injecting the second secret to a predetermined location of the executable code). In an embodiment, the manner in which the verification data may be generated is agreed upon between the hardware device and the manufacturer of the hardware device a priori (e.g., as part of provisioning the device).

In an embodiment, the system may perform a different set of steps to determine whether the attestation is authentic. In an embodiment, the system does not decrypt the attestation, but instead, computes the verification data value (e.g., as described above) and encrypts the verification data using the one-time pad to produce a ciphertext, and compared the computed ciphertext with the provided attestation. If the computed ciphertext and provided attestation match (i.e., they have the same value) then the system may determine that the received attestation is authentic.

In an embodiment, the system determines whether 614 the attestation is authentic based on one or more of the techniques described above. In an embodiment, if the system determines that the attestation is authentic, the system runs 616 the executable code. In an embodiment, the executable code, when executed, causes the system to support a cryptographic algorithm that is determined to be secure. It should be noted that the cryptographic algorithm being considered secure does not necessarily mean that the cryptographic algorithm is mathematically proven to be secure, but rather that the cryptographic algorithm is generally considered to be secure for the particular use cases, which may be a determination that is made based on the consensus of computer security professionals such as software engineers, computer security experts, cryptography experts, academics, and more. In an embodiment, the cryptographic algorithm is invented or discovered at some point in time after the hardware device was provisioned with the first secret.

In an embodiment, if the system determines the attestation is not authentic, the system discards 618 the executable code by at least refuses to run it. In an embodiment, the system may perform other steps either in addition to or in lieu of discarding the executable code, such as by providing the executable code and/or the attestation to the manufacturer for further analysis (e.g., the failure may be due to a fake attestation being sent, which may indicate that a malicious party is attempting a brute force attack), surfacing an error dialog in a graphical user interface (GUI), command-line interface (CLI), logs, and more. In an embodiment, the system, in response to a threshold rate and/or number of failed attempts, causes physical destruction of the first secret, such as by burning a fuse that is used to store the first secret.

Figure 7:
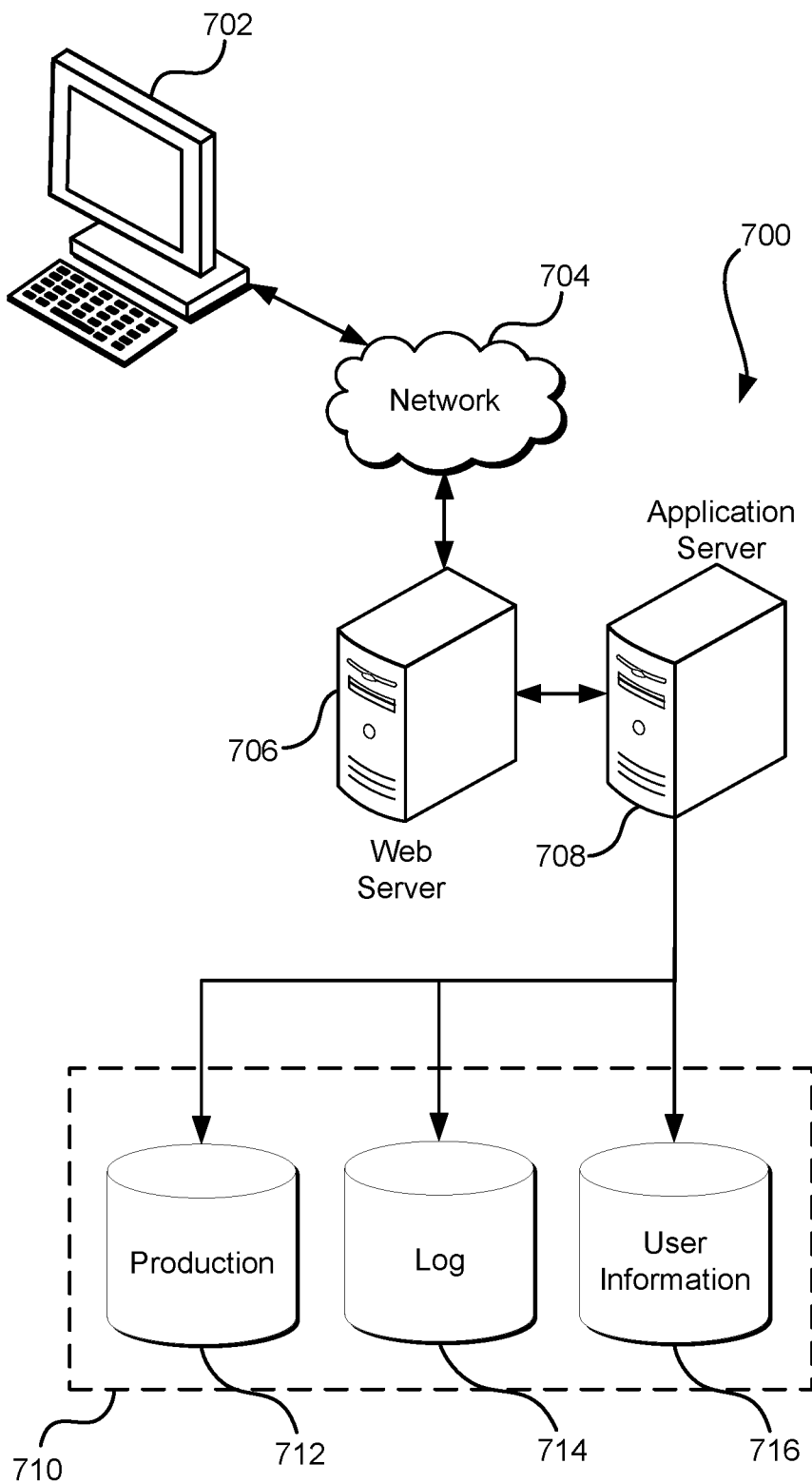
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto and the application server 708 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    generating a hash output using a secret and executable code of an update that causes previously installed executable codes of a hardware device to be updated and to be applied by a hardware device that securely stores a one-time pad, wherein the update has not been previously installed on the hardware device and wherein the hash output is a hash of the secret and the executable code of the update together;
    using a one-time pad to encrypt the hash output, thereby generating an encrypted hash output; and
    providing the encrypted hash output to the hardware device to cause the hardware device to run the executable code to apply the update to enable the hardware device to perform cryptographic operations using the secret.

2. The computer-implemented method of claim 1, wherein the executable code comprises code that, if applied by the hardware device, causes firmware of the hardware device to be updated.

3. The computer-implemented method of claim 1, wherein the encrypted hash output is decryptable to verify the executable code applying the update.

4. The computer-implemented method of claim 1, further comprising:
    identifying a cryptographic algorithm; and
    generating the executable code, wherein the executable code, if applied by the hardware device, enables the hardware device to perform the cryptographic operations according to the cryptographic algorithm.

5. A system, comprising memory storing instructions that, as a result of execution by one or more processors, cause the system to:
    generate a hash output using a first secret and executable code of an update that causes previously installed executable codes of a hardware device to be updated, wherein the update has not been previously installed on the hardware device;
    obtain, by encrypting the hash output, encrypted data that can be decrypted by a second secret to obtain data, wherein the second secret is securely stored by the system;
    determine that the data encodes a second the first secret and the update usable to perform operations; and
    apply the update to enable the system to perform the operations.

6. The system of claim 5, wherein the instructions further cause the system to:
    decrypt the encrypted data using the second secret to obtain the data;
    generate an output based on the first secret and the update; and
    apply the update in response to verifying that the data and the output match.

7. The system of claim 6, wherein the instructions to generate the output cause the system to:

concatenate the update and the first secret to generate concatenated data; and use at least the concatenated data as an input to a cryptographic hash function to generate the output.

8. The system of claim 5, wherein the executable code of the update, if executed, causes the system to generate, based on the first secret, a trust anchor.

9. The system of claim 8, wherein the instructions that cause the system to generate the trust anchor include instructions to generate a root certificate.

10. The system of claim 5, wherein:

the instructions further comprise instructions that cause the system to receive the update from a second computing entity different from a first computing entity associated with the encrypted data.

11. The system of claim 5, further comprising one or more fuses, wherein:

the second secret is securely stored in the one or more fuses; and physical destruction of the one or more fuses is caused in response to detecting an attempt to physically access the one or more fuses.

12. The system of claim 5, wherein the instructions to enable the system to perform the operations enable the system to perform cryptographic operations.

13. A non-transitory computer-readable storage medium storing thereon instructions that, if executed by one or more processors, cause a system to:

generate a hash output using a first secret and executable code of an update that causes previously installed executable codes of a hardware device to be updated, wherein the update has not been previously installed on the hardware device;

obtain, by encrypting the hash output, encrypted data that can be decrypted by a second secret to obtain data, wherein the second secret is securely stored by the system;

detect that the data comprises first secret and the update usable to perform operations; and apply the update to enable the system to perform the operations.

14. The non-transitory computer-readable storage medium of claim 13, wherein the instructions further cause the system to:

decrypt the encrypted data using the second secret to obtain the data;

generate an output based on the first secret; and apply the update if the data and the output match.

15. The non-transitory computer-readable storage medium of claim 14, wherein the instructions to generate the output cause the system to:

combine the update and the first secret to generate combined data; and use at least the combined data as an input to a hash function to generate the output.

16. The non-transitory computer-readable storage medium of claim 13, wherein the executable code of the update, if executed, causes the system to generate, based on the first secret, cryptographic material.

17. The non-transitory computer-readable storage medium of claim 16, wherein the cryptographic material corresponds to a digital certificate.

18. The non-transitory computer-readable storage medium of claim 13, wherein the instructions further comprise instructions that cause the system to receive the update from a second computing entity, wherein a first computing entity associated with the encrypted data and the second computing entity are different.

19. The non-transitory computer-readable storage medium of claim 13, wherein the second secret is comprised in one or more fuses of the system.

20. The non-transitory computer-readable storage medium of claim 13, wherein the operations comprise cryptographic operations.

* * * * *